United States Patent
Bonic et al.

(10) Patent No.: US 12,073,213 B2
(45) Date of Patent: Aug. 27, 2024

(54) AUTOMATIC GENERATION OF INTERFACES FOR OPTIMIZING CODEBASES

(71) Applicant: Red Hat, Inc., Raleigh, NC (US)

(72) Inventors: Janos Bonic, Vienna (AT); Sanja Bonic, Vienna (AT); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 25 days.

(21) Appl. No.: 17/875,545

(22) Filed: Jul. 28, 2022

(65) Prior Publication Data

US 2024/0036861 A1 Feb. 1, 2024

(51) Int. Cl.
*G06F 8/76* (2018.01)
*G06F 8/71* (2018.01)

(52) U.S. Cl.
CPC . *G06F 8/76* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 6,269,475 B1 * | 7/2001 | Farrell | G06F 8/33 717/113 |
| 6,615,199 B1 | 9/2003 | Bowman-Amuah | |
| 8,073,798 B2 | 12/2011 | de Kleer | |
| 8,572,566 B2 | 10/2013 | Gass et al. | |
| 8,706,771 B2 | 4/2014 | Gass et al. | |
| 9,027,002 B2 | 5/2015 | Chikahisa et al. | |
| 2003/0145308 A1 * | 7/2003 | Geisinger | G06F 8/41 717/114 |
| 2004/0049765 A1 * | 3/2004 | Hasha | H05B 47/155 717/165 |
| 2006/0031850 A1 * | 2/2006 | Falter | G06F 8/34 719/320 |

OTHER PUBLICATIONS

Ubale, Vikas, "Interface in OOPS," <https://medium.com/@ubale.vikas9/interface-in-oops-6eae3731c242>, Jun. 5, 2019, p. 1-10. (Year: 2019).*
Bucher, H. et al., "An Integrated Approach Enabling Cross-Domain Simulation of Model-Based E/E Architectures," SAE Technical Paper, SAE Technical Paper 2017-01-0006, doi.org/10.4271/2017-01-0006, 2017, 14 pages.
Chae, K. et al., "Automatically Generating Features for Learning Program Analysis Heuristics," arXiv:1612.09394 [cs.PL], arxiv.org/pdf/1612.09394.pdf, Dec. 30, 2016, 15 pages.
Sattaya-Aphitan et al., "A Meta-Model for Automatic Modeling Dynamic Web Applications," Journal of Theoretical and Applied Information Technology, jatit.org/volumes/Vol84No2/6Vol84No2.pdf, Feb. 20, 2016, 12 pages.

* cited by examiner

*Primary Examiner* — Qing Chen
(74) *Attorney, Agent, or Firm* — Dority & Manning, P.A.

(57) ABSTRACT

A plurality of invoking units of software instructions that each directly invoke one or more functions of an invoked unit of software instructions are identified. Based on at least one criterion a first function of the one or more functions is selected for inclusion in an interface. An interfacing unit of software instructions that implements the interface is generated, the interface being configured to be invoked by at least one of the plurality of invoking units of software instructions, and when invoked, to invoke the first function.

20 Claims, 5 Drawing Sheets

AUTOMATIC GENERATION OF INTERFACES FOR OPTIMIZING CODEBASES

BACKGROUND

Software instructions are written by engineers using a variety of programming languages. Many of these programming languages allow for the implementation of abstraction layers such as interfaces. Interfaces serve as an abstraction layer that can be invoked by an invoking unit of software instructions to invoke a function with expected behavior. The interface, once invoked, can invoke a variety of different functions that are each configured to provide the expected behavior.

SUMMARY

The examples implement mechanisms for automatic generation of interfaces. A plurality of invoking units of software instructions can be identified. Each of the plurality of invoking units of software instructions directly invokes one or more functions of an invoked unit of software instructions. Based on at least one criterion, a first function can be selected from one or more functions for inclusion in an interface (e.g., an abstraction layer, etc.). An interfacing unit of software instructions that implements the interface can be generated. The interface is configured to be invoked by at least one of the plurality of invoking units of software instructions, and when invoked, to invoke the first function.

In one example a method is provided. The method includes identifying, by a computing system comprising one or more processor devices, a plurality of invoking units of software instructions that each directly invoke one or more functions of an invoked unit of software instructions. The method includes, based on at least one criterion, selecting a first function of the one or more functions for inclusion in an interface. The method includes generating an interfacing unit of software instructions that implements the interface, the interface being configured to be invoked by at least one of the plurality of invoking units of software instructions, and when invoked, to invoke the first function.

In another example, a computing system is provided. The computing system includes memory. The computing system includes one or more processor devices coupled to the memory. The one or more processors are to identify a plurality of invoking units of software instructions that each directly invoke one or more functions of an invoked unit of software instructions. The one or more processors are to, based on at least one criterion, select a first function of the one or more functions for inclusion in an interface. The one or more processors are to generate an interfacing unit of software instructions that implements the interface, the interface being configured to be invoked by at least one of the plurality of invoking units of software instructions, and when invoked, to invoke the first function.

In yet another example, a non-transitory computer-readable storage medium is provided. The non-transitory computer-readable storage medium includes executable instructions. The executable instructions are to cause a processor device to identify a plurality of invoking units of software instructions that each directly invoke one or more functions of an invoked unit of software instructions. The executable instructions are to cause a processor device to, based on at least one criterion, select a first function of the one or more functions for inclusion in an interface. The executable instructions are to cause a processor device to generate an interfacing unit of software instructions that implements the interface, the interface being configured to be invoked by at least one of the plurality of invoking units of software instructions, and when invoked, to invoke the first function.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
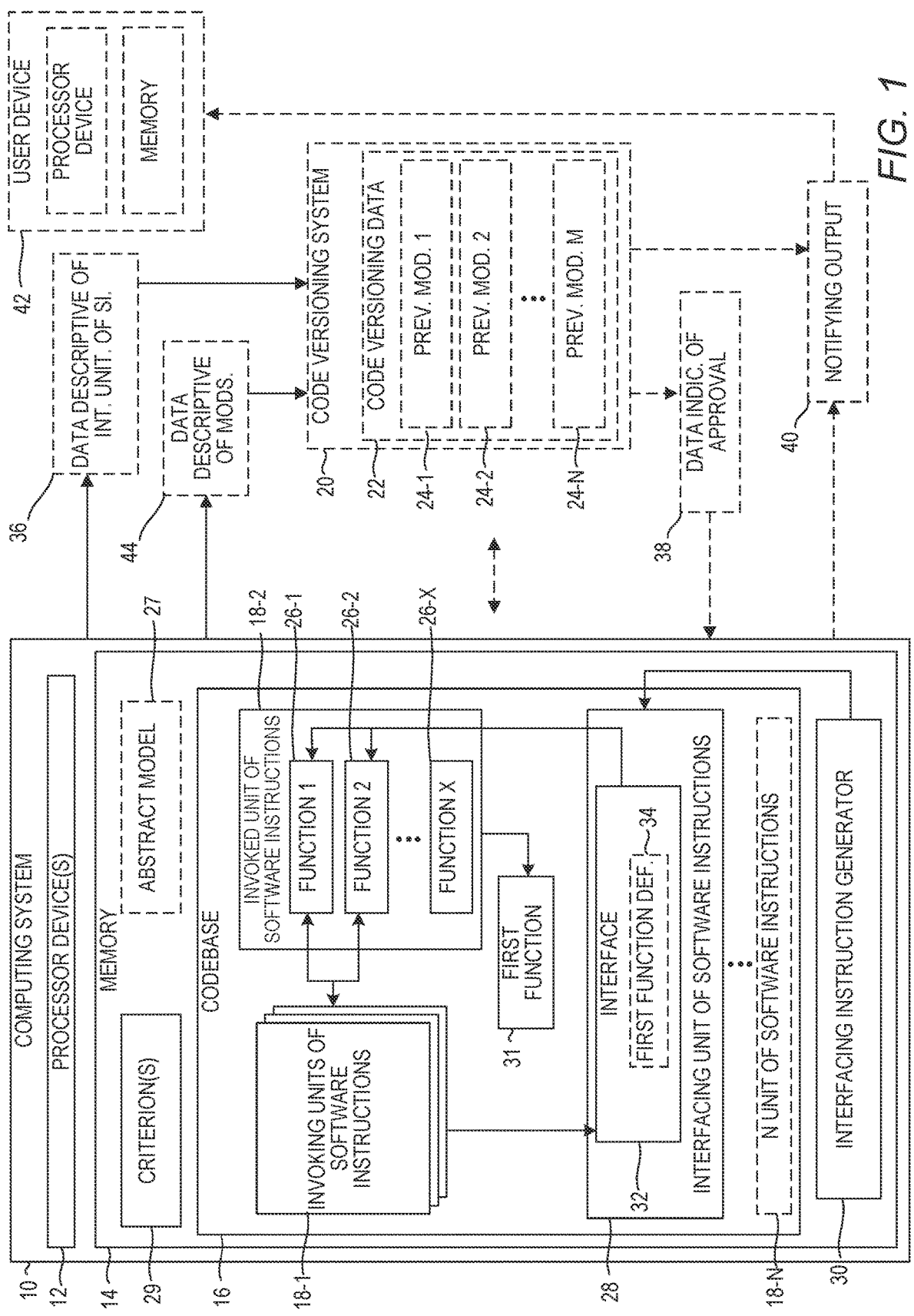
FIG. 1 is a block diagram of an environment suitable for implementing automatic generation of interfaces according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

In software engineering, an invoked unit of software instructions (e.g., a package, a block of code, a file, etc.) can be directly invoked by a number of invoking units of software instructions. As an example, an interface for a web shop application can include multiple units of software instructions. One of these units of software instructions can include a storage function for storing online orders to the web shop. Other units of software instructions (i.e., invoking units of software instructions) can invoke the storage function of the unit of software instructions (i.e., an invoked unit of software instructions) to fulfill other features of the web shop application (e.g., receiving web shop orders, finalizing a web shop order, etc.)

Initially, during the software development process, the storage function may be a storage testing function that stores online orders to volatile memory, rather than an external database, for purposes of testing. Once the function is sufficiently tested, the storage testing function may be modified to be (or replaced with) a storage production function that stores online orders to an external database (e.g., for production-time implementation). However, as the invoking units of software instructions each invoke the storage function directly, the modification or replacement of the storage testing function necessitates corresponding modifications to each of the invoking units of software instructions. In turn, modifying each of these units of software instructions consumes substantial quantities of developer resources while also increasing the likelihood that bugs and other errors appear within the codebase of the application.

To eliminate this inefficiency, software engineering practices have advanced to include intermediate units of software instructions, sometimes referred to as abstraction layers, or interfaces, that allow some units of software instructions to indirectly invoke functions of other units of software instructions. By utilizing an abstraction layer such as an interface, a software engineer can write a unit of instructions that invokes an interface without regard for the function invoked by the interface.

To follow the previous webshop example, an abstraction layer (i.e., interface) can be generated that is invoked by invoking units of software instructions, and when invoked, invokes either a storage testing function or a storage production function of the invoked unit of software instructions. By implementing this interface, a software engineer only needs to modify the interface to switch from a storage testing function to a storage production function, therefore eliminating the previously discussed inefficiencies associated with modification of each invoking unit of software instructions.

However, modern software development processes are extremely complex, often involving hundreds of software engineers working in concert to implement numerous features for an application within a limited amount of time. As such, in many cases, necessary abstraction layers are not implemented due to error, miscommunication between software engineers, a lack of development resources or time, etc.

Accordingly, implementations of the present disclosure propose systems and methods to automatically generate interfaces for optimization of application codebases. Specifically, a plurality of invoking units of software instructions (e.g., packages, files, functions, etc.) can be identified that each directly invoke one or more functions of an invoked unit of software instructions. As an example, for a web shop application codebase, a plurality of units of instructions can be identified that each directly invoke a storage function of an invoked unit of software instructions.

Based on at least one criterion, a first function of the one or more functions can be selected for inclusion in an interface. For example, a storage function may be selected for inclusion in an interface for a web shop application. For another example, a storage testing function and a storage production function may both be selected for inclusion in an interface for a web shop application.

An interfacing unit of software instructions can be generated that implements the interface. The interface can be configured to be invoked by at least one of the plurality of invoking units of software instructions. When invoked, the interface can invoke the first function. In such fashion, interfaces can be automatically generated for existing codebases to reduce or eliminate the inefficiencies associated with direct invocation of functions between units of software instructions.

As described, implementations of the present disclosure provide a number of technical effects and benefits. As one example technical effect and benefit, when a function of an invoked unit of software instructions is modified, or replaced, each invoking unit of software instructions that directly invokes the function must also be directly modified to preserve functionality. In turn, development time spent modifying each of these invoking units of software instructions consumes substantial quantities of resources (e.g., engineering resources, compute cycles, power, memory, storage, etc.) while also increasing the likelihood that bugs and other errors appear within the codebase of the application. However, implementations of the present disclosure can be utilized to identify invocation of function(s) by multiple invoking units of software instructions for which an interface is beneficial, and automatically generate an interfacing unit of software instructions that includes the interface, therefore substantially reducing or eliminating the previously discussed inefficiencies.

FIG. 1 is a block diagram of an environment suitable for implementing automatic generation of interfaces according to some implementations of the present disclosure. A computing system 10 includes processor device(s) 12 and memory 14. In some implementations, the computing system 10 may be a computing system that includes multiple computing devices. Alternatively, in some implementations, the computing system 10 may be one or more computing devices within a computing system that includes multiple computing devices. Similarly, the processor device(s) 12 may include any computing or electronic device capable of executing software instructions to implement the functionality described herein.

The memory 14 can be or otherwise include any device(s) capable of storing data, including, but not limited to, volatile memory (random access memory, etc.), non-volatile memory, storage device(s) (e.g., hard drive(s), solid state drive(s), etc.). The memory 14 can include a codebase 16 for one or more applications. The codebase 16 can include a plurality of units of software instructions 18-1 to 18-N (generally, software instructions 18). The codebase 16, and the units of software instructions 18, can be software instructions written in any type of programming language, schema, or runtime environment. (e.g., C, C++, Java, Python, etc.). For example, each of the units of software instructions 18 may be written in the C programming language.

It should be noted that the units of software instructions 18 may be organized according to any method or schema of organizing software instructions. For example, in some implementations, each of the units of software instructions 18 may be, or may be included in, a separate file of software instructions. Alternatively, in some implementations, at least some of the invoking units of software instructions 18-1 and the invoked unit of software instructions 18-2 may each be discrete units of software instructions within the same file of software instructions. As such, it should be broadly understood that a unit of software instructions 18 refers to a discrete portion of software instructions which can be organized or separated according to any sort of organizational scheme.

In some implementations, the computing system 10 may be communicatively coupled to a code versioning system 20 that provides a code versioning service for the codebase 16. The code versioning system 20 can include any computing or electronic device(s) capable of providing a code versioning service for the codebase 16 of the computing system 10. It should be noted that in some implementations, the code versioning system 20 can be implemented by the computing system 10. For example, the code versioning system 20, and code versioning data 22, can be stored in the memory 14, and can be executed by the processor device(s) 12. Alternatively, in some implementations, the code versioning system 20 may be implemented by computing device(s) included within a computing system that includes the computing system 10 (e.g., a cloud computing system, etc.).

To provide the code versioning service, the code versioning system 20 can include code versioning data 22. The code versioning data 22 can describe various aspects of the codebase 16, including previous modifications 24-1-24-M (generally, previous modification(s) 24 made to the codebase 16. For example, at a previous point in time, the codebase 16 may have been modified to include additional units of software instructions 18. The code versioning data 22 can include data that describes the previous modification(s) 24.

In some implementations, the code versioning system 20 can obtain requests to modify the codebase 16. For example, the code versioning system can receive a pull request that includes, or otherwise describes, modifications to the codebase 16. The code versioning system 20 may notify a user of the code versioning system 20 of receipt of the pull request. If the user of the code versioning system 20 approves the pull request, the code versioning system 20 can communicate with the computing system 10 to modify the codebase 16 based on the pull request. Alternatively, in some implementations, the code versioning system 20 may automatically modify the codebase 16 based on the pull request without approval from a user of the code versioning system 20.

The computing system 10 can identify a plurality of invoking units of software instructions 18-1 that directly invoke an invoked unit of software instructions 18-2. Specifically, each of the plurality of invoking units of software instructions 18-2 can invoke one or more functions 26 of the invoked unit of software instructions 18-2. For example, a first unit of instructions of the invoking units of software instructions 18-1 may invoke function 26-1, and a second unit of instructions of the invoking units of software instructions 18-1 may invoke function 26-2.

In some implementations, the computing system 10 may perform code analysis with the help of Reflection, or code compilation (e.g., into an abstract syntax tree, etc.), on the codebase 16 to identify the invoking units of software instructions 18-1 that each invoke the function(s) 26 of the invoked unit of software instructions 18-2. Specifically, in some implementations, the computing system 10 can build a meta-model for the codebase 16 that enumerates the units of software instructions 18 included in the codebase. The computing system 10 can then identify certain units of software instructions 18 that invoke the function(s) 26 of the invoked unit of software instructions 18-2.

Specifically, the computing system 10 can traverse the meta-model to identify invocation of function(s) 26 by multiple invoking units of software instructions 18-1. For example, the computing system may traverse the meta-model to identify certain types of function calls to external units of software instructions (e.g., calls that cross package boundaries, calls to a computer network, file operations, database operations, etc.). In addition, this meta-model can be utilized by the computing system 10 to determine whether the invocations are direct or indirect (i.e., whether an interface is already implemented). In some implementations, the computing system 10 may traverse the meta-model to identify groups of functions (e.g., classes, structs with receivers, etc.) and group calls to the groups of functions together.

For example, in some implementations, the computing system 10 can generate an abstract model 27 that identifies a plurality of units of software instructions 18 that are collectively included in the codebase 16 of an application (e.g., an abstract syntax tree, a meta-model, etc.). Based at least in part on the abstract model 27, the computing system 10 can identify the plurality of invoking units of software instructions 18-1 that each directly invoke the one or more functions 26 of the invoked unit of software instructions 18-2.

In some implementations, the units of software instructions 18 may be, include, or be included in one or more files of software instructions. For example, each of the invoking units of software instructions 18-1, and the invoked unit of software instructions 18-2, may be stored in a separate file of software instructions. Alternatively, in some implementations, the invoked unit of software instructions 18-2 may be included in a same file as at least one of the one or more invoking units of software instructions 18-1.

Based on at least one criterion 29, the computing system 10 can select a first function 31 of the one or more functions 26 for inclusion in an interface 32. The first function 31 can include one or more functions. For example, the computing system 10 may select function 26-1 as a first function 31 for inclusion in the interface 32. For another example, the computing system 10 may select functions 26-1 and 26-2 as first functions 31 for inclusion in the interface 32.

In some implementations, the first function 31 can be a grouping of the function(s) 26 that is determined by the computing system 10. For example, the function 26-1 and the function 26-2 may both be functions of a same type (e.g., same class, struct with receivers, etc.). The computing system 10 can group the functions 26-1 and 26-2 together collectively as the first function 31.

The at least one criterion 29 can be or otherwise include any criterion suitable to select a function for inclusion in the interface 32. In some implementations, the at least one criterion 29 may be a number of invoking units of software instructions that invoke each of the one or more functions 26 (i.e., evaluating how many different units of instructions invokes the function). For example, if function 26-1 of the invoked unit of software instructions 18-2 is invoked by a relatively large number of invoking units of software instructions 18-1, it is likely that the function 26-1 should be included in the interface 32. Conversely, a function 26 that is only invoked by a single invoking unit of software instructions 18-1 is unlikely to require inclusion in the interface 32.

In some implementations, the at least one criterion 29 may be a number of calls to an external unit of software instructions performed by each of the one or more functions 26. An external call can be any call, invocation, or communication with a unit of software instructions other than the invoked unit of software instructions 18-2 (e.g., calls to the computer network, file operations, database operations, units of software outside the scope of the application, etc.). For example, if the function 26-1 performs call(s) to external units of software, it is more likely to be beneficial to include the function 26-1 in the interface 32.

In some implementations, the at least one criterion 29 may be a degree of documentation associated with each of the one or more functions 26 (e.g., a quantity of comments within the invoked unit of software instructions 18-2 that are associated with the function, etc.). For example, if software engineers have provided a substantial quantity of documentation for the function 26-1, it is possible that the function 26-1 may already be an abstraction, or similar, and therefore should not be included in the interface 32.

In some implementations, the at least one criterion 29 may be a degree of complexity associated with each of the one or more functions 26 (e.g., a number of software instructions in the invoked unit of software instructions 18-2 that implements the function, a computational complexity of the function, etc.). For example, if the function 26-1 is implemented using a relatively large number of software instructions, it is more likely to be beneficial to include the function 26-1 in the interface 32. For another example, if execution of the function 26-1 requires a relatively quantity of computing resources, it is more likely to be beneficial to include the function 26-1 in the interface 32.

In some implementations, the at least one criterion 29 can be determined based at least in part on the code versioning data 22 from the code versioning system 20. For example, the at least one criterion 29 may be, or may otherwise be derived from, the previous modifications 24-1 to 24-N. For another example, the code versioning data 22 may describe one or more characteristics of the function(s) 26 (e.g., when a function was last updated, how many times a function has been updated, a relative importance of a function, etc.).

The computing system 10 can generate an interfacing unit of software instructions 28. For example, the computing system may utilize an interfacing instruction generator 30 to generate the interfacing unit of software instructions 28. The interfacing unit of software instructions 28 can implement an interface 32. The interface 32 can be an abstraction layer that is configured to be invoked by at least one of the plurality of invoking units of software instructions 18-1, and when invoked, to invoke the first function of the one or more functions 26.

Because the interfacing instruction generator 30 is a component of the computing system 10, functionality implemented by the interfacing instruction generator 30 may be attributed to the computing system 10 generally. Moreover, in examples where the interfacing instruction generator 30 comprises software instructions that program the processor device(s) 12 to carry out functionality discussed herein, functionality implemented by the interfacing instruction generator 30 may be attributed herein to the processor device(s) 12.

As an example, the invoking units of software instructions 18-1 can each implement various features of a web shop application. The functions 26 of the invoked unit of software instructions 18-2 can be functions used to store web orders for the web shop application. For example, function 26-1 may be a function to store web shop orders in a first type of database, and the function 26-2 may be a function to store web shop orders in a second type of database. Functions 26-1 and 26-2 can be selected as first functions 31 for inclusion in the interface 32 based on at least one criterion 29. The interface 32 can be invoked by the invoking unit of software instructions 18-1, and when invoked, invoke the first function 31 (e.g., function 26-1 and/or function 26-2).

Furthermore, the first function 31 invoked by the interface can be changed by modifying the invoking unit of software instructions 28, therefore eliminating the need to modify each of the invoking units of software instructions 18-1.

In some implementations, the interfacing unit of software instructions 28 may be included in a same file as at least some of the invoking units of software instructions 18-1, the invoked unit of software instructions 18-2, or both. Alternatively, in some implementations, the interfacing unit of software instructions 28 may be included in a file different than file(s) including the invoking units of software instructions 18-1 and the invoked unit of software instructions 18-2.

In some implementations, the interface 32 includes a first function definition 34. Specifically, the interfacing unit of software instructions 28 that implements the interface 32 can include a first function definition 34 for the first function 31. The first function definition 34 describes the first function 31, parameters of the first function 31, return values of the first function 31, etc. It should be noted that the format of the first function definition 34 may be specific to the programming language in which the interfacing unit of software instructions 28 are written. Specifically, in some implementations, the first function definition 34 can represent multiple function(s) that are within the same unit of software. For example, the first function definition 34 may define a function that stores a webshop cart and a function that retrieves a webshop cart that are both included within the same unit of software.

In some implementations, the computing system 10 can provide data descriptive of the interfacing unit of software instructions 36 to the code versioning system 20. It should be noted that the data descriptive of the interfacing unit of software instructions 36 can describe the interfacing unit of software instructions 36 in any fashion. In some implementations, the data descriptive of the interfacing unit of software instructions 36 can be or otherwise include a summarization of the interfacing unit of software instructions 36. For example, the data descriptive of the interfacing unit of software instructions 36 can indicate lines of software instructions to be added, and can indicate to a user of the code versioning system 20 that the instructions are being added to implement the interface 32.

In some implementations, the data descriptive of the interfacing unit of software instructions 36 can be formatted as a pull request to the code versioning system 20. The pull request can indicate the interfacing units of software instructions 28 to users of the code versioning system 20 and can be approved by users of the code versioning system 20. Once approved, the codebase 16 can be modified according to the modifications described by the pull request.

In some implementations, the computing system 10 can obtain data indicative of approval of the interfacing unit of software instructions 36. Specifically, the data 38 can indicate that adding the interfacing unit of software instructions 28 to the codebase 16 has received approval. For example, in some implementations, the computing system 10, and/or the code versioning system 20, can transmit a notifying output 40 to a user device 42 associated with a user of the code versioning system 20. The notifying output can be configured to indicate to the user that modifications to the codebase 16 that add the interfacing unit of software instructions 28 to the codebase 16 have been proposed. For example, the notifying output 40 may be configured to alert a user device 42 of a user of the code versioning system 20. For another example, the notifying output 40 may be configured to instruct the code versioning system 20 to provide a notification to the user device 42.

Responsively, the user device 42 can indicate approval of the modifications the code versioning system 20. For example, the data indicative of approval of the interfacing unit of software instructions 36 can be a pull request to the code versioning system. The user can approve the pull request via the user device 42. The code versioning system 20 can transmit the data indicative of approval 38 to the computing system 10. In some implementations, the computing system 10 can modify the codebase 16 to add the interfacing unit of software instructions 28. Additionally, or alternatively, in some implementations, the code versioning system 20 can modify a copy, mirror, or various version(s) of the codebase 16 stored at the code versioning system 20 to add the interfacing unit of software instructions 28.

In some implementations, the computing system 10 can provide data that describes modifications to the at least one of the invoking units of software instructions 44 to invoke the interface 32. For example, the at least one of the invoking units of software instructions 18-1 initially invoke the first function 31. The computing system 10 can modify the codebase 16 to add the interfacing unit of software instructions 28 that implements the interface 32. However, the at least one of the invoking units of software instructions 18-1 can be modified to indirectly invoke the first function 31 via the interface 32. Accordingly, the computing system 10 can generate the data that describes the modifications to the at least one of the invoking units of software instructions 44 to invoke the interface 32 to invoke the first function 31.

In some implementations, the data descriptive of modifications 44 can be provided to the code versioning system 20. The code versioning system 20 can receive approval of the modifications in the same manner as previously described with regards to the data descriptive of the interfacing unit of software instructions 36. The computing system can modify the at least one of the invoking units of software instructions 18-1 to invoke the interface 32 to indirectly invoke the first function 31.

It should be noted that the data descriptive of the modifications 44 can describe the modifications that modify the invoking units of software instructions 18-1 in any fashion. In some implementations, the data descriptive of the modifications 44 can be or otherwise include a summarization of the modifications to the invoking units of software instructions 18-1. For example, the data descriptive of the modifications 44 can indicate which software instructions of the invoking units of software instructions 18-1 (i.e., which lines of code, etc.) are to be deleted, and can indicate to a user of the code versioning system 20 that the instructions are being deleted to invoke the interface 32.

Additionally, or alternatively, in some implementations the data descriptive of the modifications 44 may be or otherwise include software instructions that, when executed, modify software instructions that directly invoke the first function 31 to instead invoke the interface 32. In some implementations, the data descriptive of the modifications can be formatted as a pull request to the code versioning system 20. The pull request can indicate the modifications to the codebase 16 to users of the code versioning system 20 and can be approved by users of the code versioning system 20. Once approved, the codebase 16 can be modified according to the modifications described by the pull request.

In some implementations, the modifications described by the data descriptive of the modifications 44 can modify the invoking units of software instructions 18-1 to modify software instructions that directly invoke the first function 31 from the invoking unit of software instructions 18-1. For example, one of the invoking units of software instructions 18-1 may include the following software instructions, represented as pseudocode, that invoke the first function 31:

```
func invoking_function (input)
{
    first_function (input);
}
```

The modifications can modify the invoking unit of software instructions 18-1 in the following manner to modify line 3 to instead invoke the interface 32 rather than the first function 31:

```
func invoking_function (input)
{
    first_function (input);
    interface (input);
}
```

Figure 2:
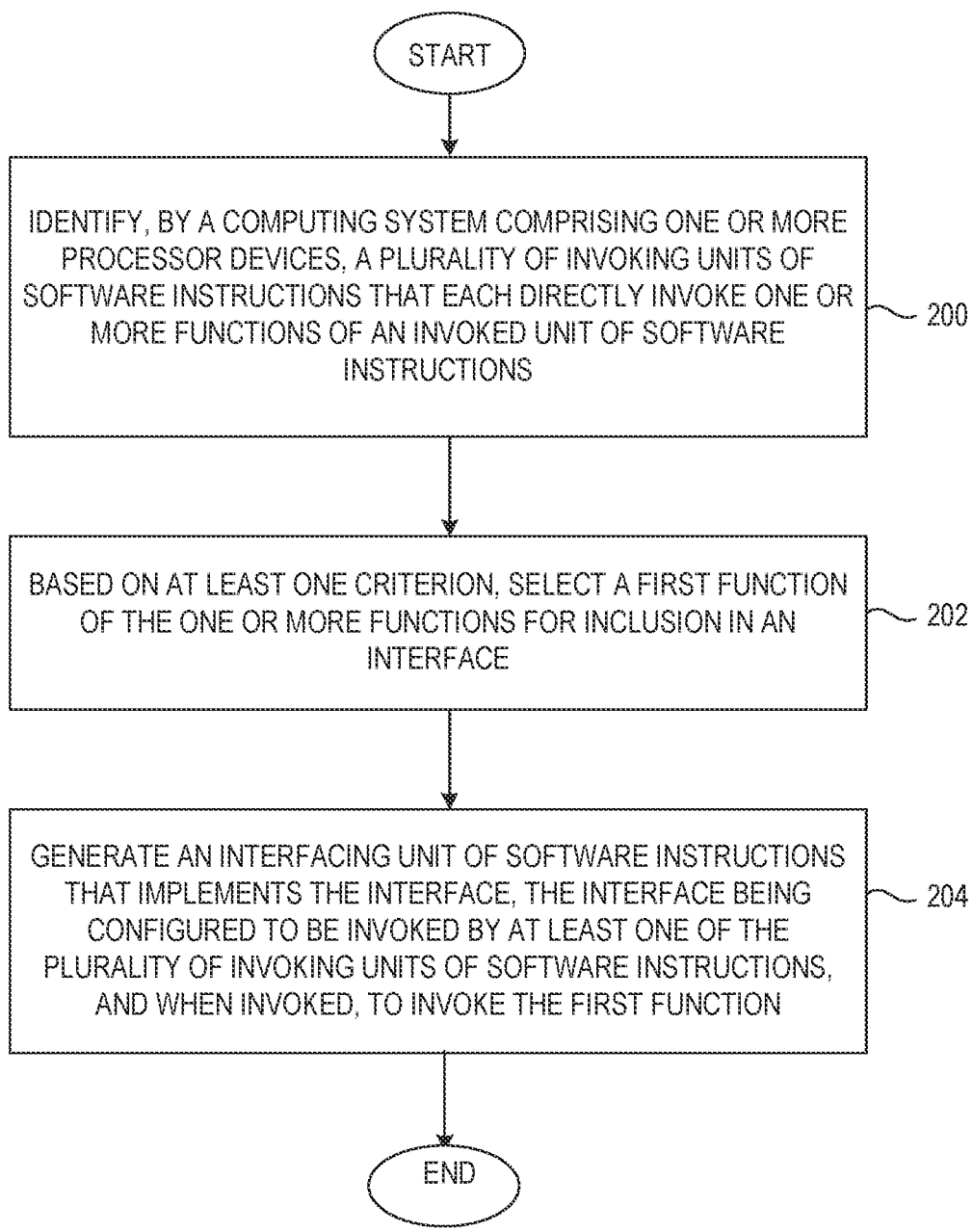
FIG. 2 is a flowchart of a method for identifying and removing redundant interfaces according to some implementations of the present disclosure.

FIG. 2 is a flowchart of a method for identifying and removing redundant interfaces according to some implementations of the present disclosure. FIG. 2 will be discussed in conjunction with FIG. 1.

The computing system 10 identifies the plurality of invoking units of software instructions 18-1 that each directly invoke one or more functions 26 of the invoked unit of software instructions 18-2 (FIG. 2, block 200). The computing system 10 selects, based on at least one criterion 29, a first function 31 of the one or more functions 26 for inclusion in an interface 32 (FIG. 2, block 202). The computing system 10 generates an interfacing unit of software instructions 28 that implements the interface 32, the interface 32 being configured to be invoked by at least one of the plurality of invoking units of software instructions 18-1, and when invoked, to invoke the first function 31 (FIG. 2, block 204).

Figure 3:
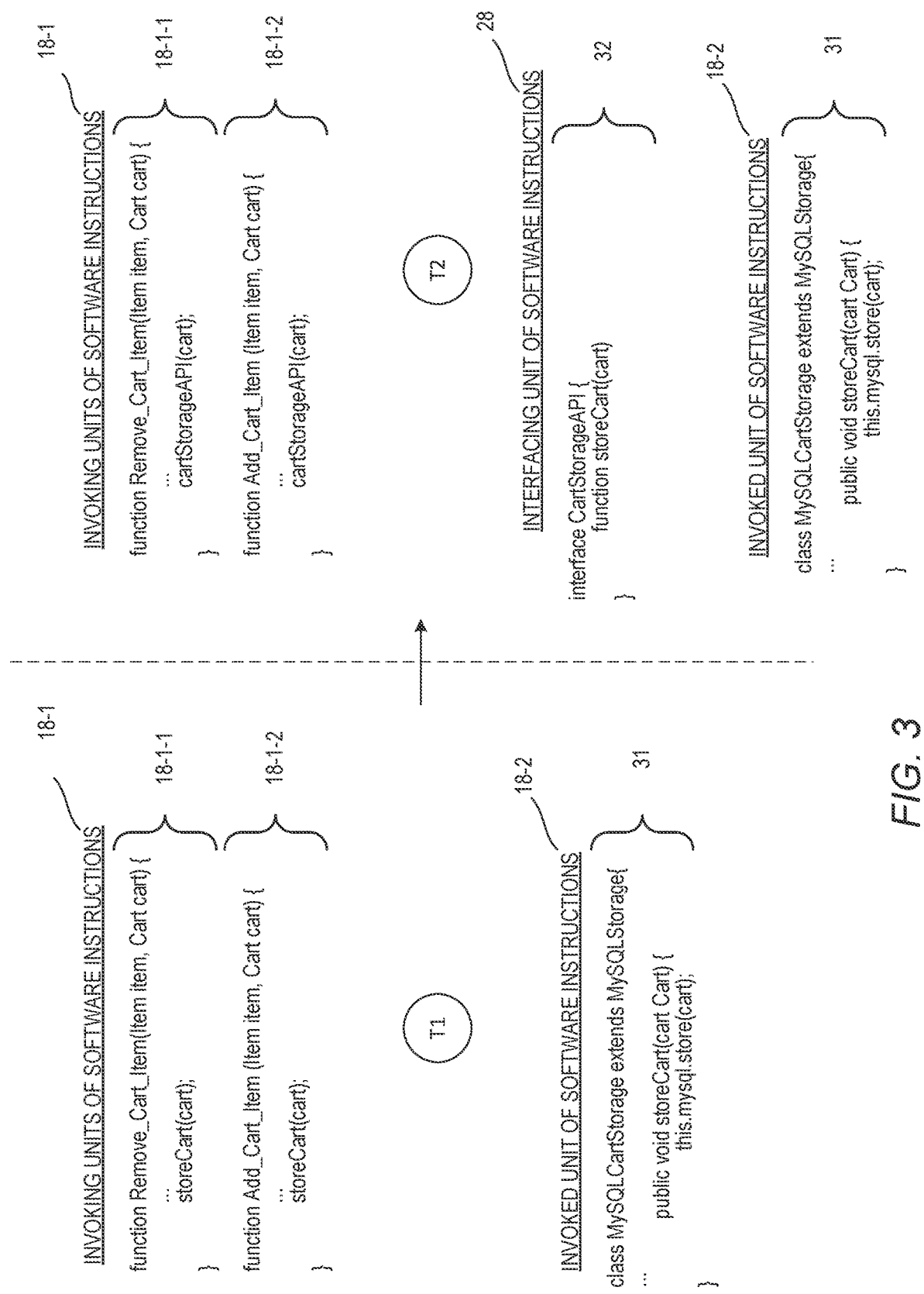
FIG. 3 illustrates example units of software instructions for automatic generation of interfaces according to some implementations of the present disclosure.

FIG. 3 illustrates example units of software instructions for automatic generation of interfaces according to some implementations of the present disclosure. FIG. 3 will be discussed in conjunction with FIG. 1. It should be noted that although FIG. 3 includes software instructions written according to the Java programming language, implementations of the present disclosure are not limited to any specific programming language. Rather, implementations of the present disclosure may be utilized using any programming language(s), intermediate software instruction(s), compiled software instruction(s), machine code, etc.

Invoking units of software instructions 18-1 includes a first invoking unit of software instructions 18-1-1 and a second invoking unit of software instructions 18-1-2 that each provide features of a web shop application. Specifically, invoking unit of software instructions 18-1-1 is a function for removing an item from a cart of a user, and invoking unit of software instructions 18-1-2 is a function for adding an item to a cart of a user. To do so, both invoking units of software instructions 18-1-1 and 18-1-2 invoke first function 31 of invoked units of software instructions 18-2 to store the cart of the user.

As depicted, at time T1, invoking units of software instructions 18-1-1 and 18-1-2 both directly invoke first function 31 of invoked units of software instructions 18-2. However, at time T2, implementations of the present disclosure can be utilized to automatically generate the interfacing unit of software instructions 28 that implements the interface 32. Specifically, at time T2, the first function 31 can be selected for inclusion in the interface 32 as previously described. Computing system 10 can generate interfacing unit of software instructions 28, which implements the interface 32. Interface 32 is configured to be invoked by the invoking units of software instructions 18-1-1 and 18-2-2, and when invoked, invoke the first function 31 of the invoked unit of software instructions 18-2.

Additionally, at time T2, invoking units of software instructions 18-1 can be modified to invoke the interface 32. For example, as depicted, invoking units of software instructions 18-1-1 and 18-1-2 have both been modified to invoke the interface 32. In such fashion, the interfacing units of software instructions 28 can be automatically generated to implement the interface 32, eliminating the substantial inefficiencies associated with direct invocation of the first function 31 by multiple invoking units of software instructions 18-1.

Figure 4:
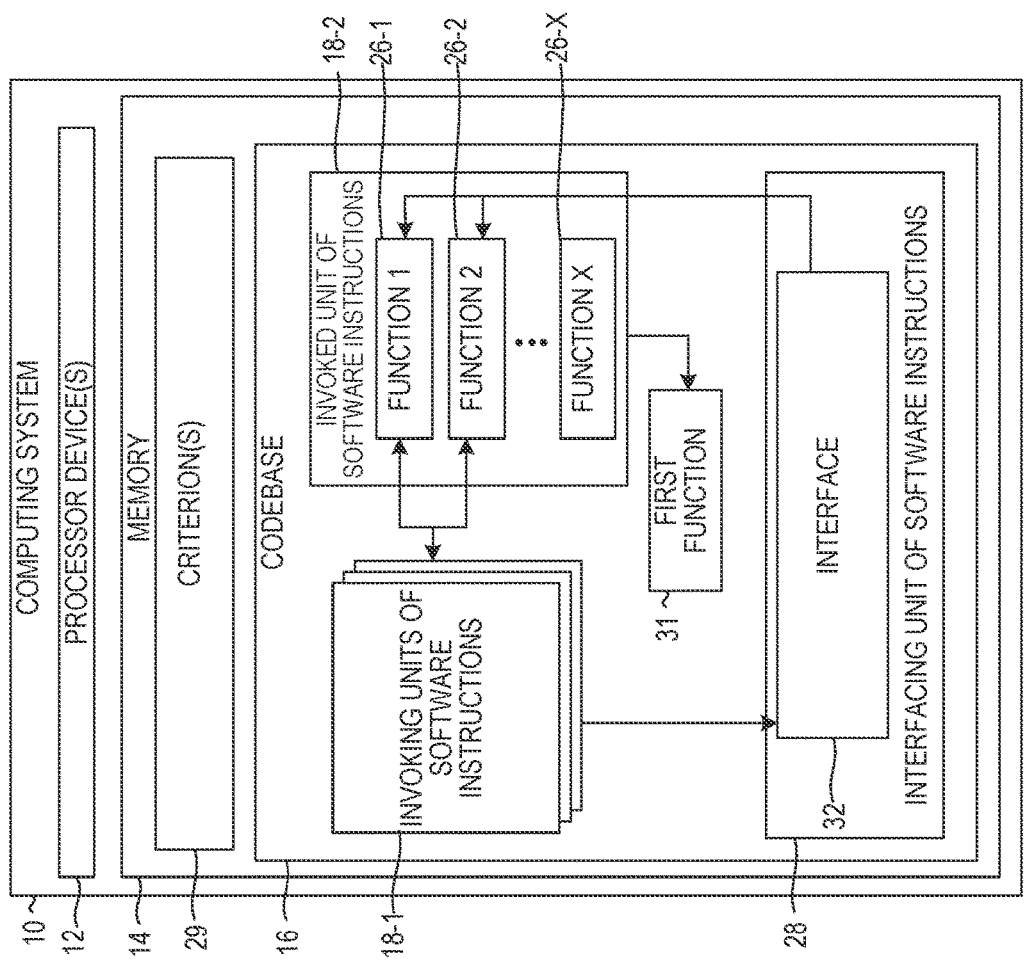
FIG. 4 is a simplified block diagram of the environment illustrated in FIG. 1 according to one implementation of the present disclosure.

FIG. 4 is a simplified block diagram of the environment illustrated in FIG. 1 according to one implementation of the present disclosure. The computing system 10 includes the memory 14 and the processor device(s) 12 coupled to the memory 14. The processor device(s) 12 is to identify the plurality of invoking units of software instructions 18-1 that each directly invoke the one or more functions 26 of the invoked unit of software instructions 18-2. The processor device(s) 12 is further to, based on the at least one criterion 29, select the first function 31 of the one or more functions 26. The processor device(s) 12 is further to generate the interfacing unit of software instructions 28 that implements the interface 32, the interface 32 being configured to be invoked by at least one of the plurality of invoking units of software instructions 18-1, and when invoked, to invoke the first function 31.

Figure 5:
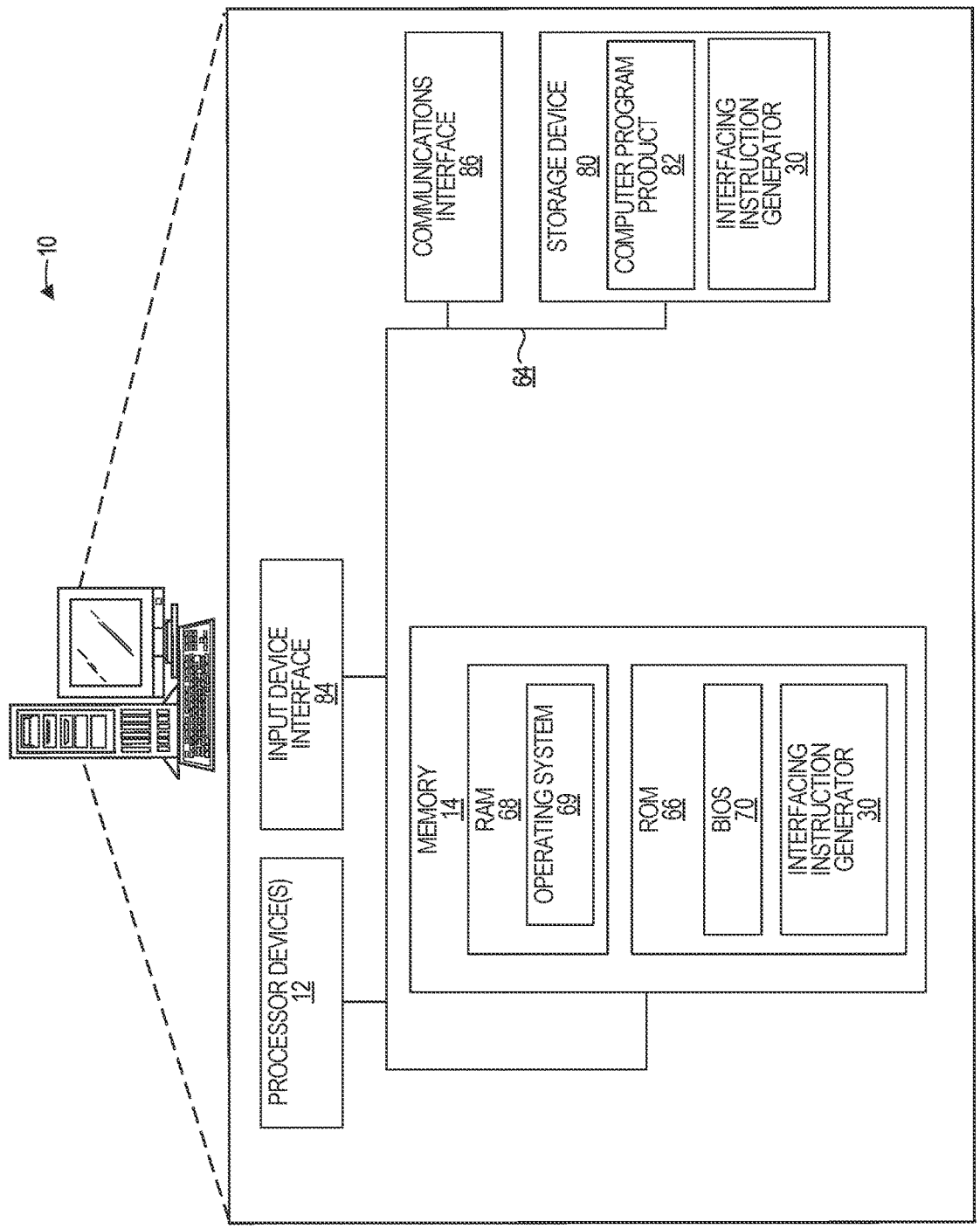
FIG. 5 is a block diagram of a computing device suitable for implementing examples according to some implementations of the present disclosure.

FIG. 5 is a block diagram of the computing system 10 suitable for implementing examples according to some implementations of the present disclosure. The computing system 10 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 10 includes the processor device(s) 12, the memory 14, and a system bus 64. The system bus 64 provides an interface for system components including, but not limited to, the memory 14 and the processor device(s) 12. The processor device(s) 12 can be or otherwise include one or more of any commercially available or proprietary processor.

The system bus 64 may be any of several types of bus structures that may further interconnect to a memory bus (with or without a memory controller), a peripheral bus, and/or a local bus using any of a variety of commercially available bus architectures. The memory 14 (e.g., system memory, etc.) may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing system 10. The volatile memory 68 may also include a high-speed RAM, such as static RAM, for caching data.

The computing system 10 may further include or be coupled to a non-transitory computer-readable storage medium such as the storage device 80, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 80 and other drives associated with computer-readable media and computer-usable media may provide non-volatile storage of data, data structures, computer-executable instructions, and the like.

A number of modules can be stored in the storage device 80 and in the volatile memory 68, including an operating system 69 and one or more program modules, such as the interfacing instruction generator 30, which may implement the functionality described herein in whole or in part. All or a portion of the examples may be implemented as a computer program product 82 stored on a transitory or non-transitory computer-usable or computer-readable storage medium, such as the storage device 80, which includes complex programming instructions, such as complex computer-readable program code, to cause the processor device(s) 12 to carry out the steps described herein. Thus, the computer-readable program code can comprise software instructions for implementing the functionality of the examples described herein when executed on the processor device(s) 12. The processor device(s) 12, in conjunction with the storage device 80 or the non-volatile memory 66, may serve as a controller, or control system, for the computing system 10 that is to implement the functionality described herein.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 12 through an input device interface 84 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing system 10 may also include the communications interface 86 suitable for communicating with the network 50 as appropriate or desired. The computing system 10 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

The invention claimed is:

1. A method comprising:
   obtaining, by a computing system comprising one or more processor devices, codebase information for a codebase of an application that identifies a plurality of units of software instructions included in the codebase of the application;
   based at least in part on the codebase information for the codebase of the application that identifies the plurality of units of software instructions, identifying, by the computing system, a plurality of invoking units of software instructions that each directly invoke one or more functions of an invoked unit of software instructions, wherein the plurality of units of software instructions comprises the plurality of invoking units of software instructions and the invoked unit of software instructions;

based on at least one criterion, selecting a first function of the one or more functions of the invoked unit of software instructions for inclusion in an interface; and generating an interfacing unit of software instructions that implements the interface, wherein the interface is configured to be invoked by at least one invoking unit of software instructions of the plurality of invoking units of software instructions, and when the interface is invoked, to invoke the first function of the one or more functions of the invoked unit of software instructions.

2. The method of claim 1, wherein the method further comprises providing data descriptive of the interfacing unit of software instructions.

3. The method of claim 2, wherein providing the data descriptive of the interfacing unit of software instructions comprises providing data descriptive of the interfacing unit of software instructions to a code versioning system for the codebase of the application.

4. The method of claim 3, wherein the data descriptive of the interfacing unit of software instructions comprises a summarization of the interfacing unit of software instructions.

5. The method of claim 3, wherein the method further comprises obtaining, from the code versioning system, data indicative of approval of the interfacing unit of software instructions.

6. The method of claim 5, wherein the method further comprises modifying the codebase of the application to add the interfacing unit of software instructions.

7. The method of claim 1, wherein obtaining the codebase information for the codebase of the application comprises:
generating an abstract model that identifies the plurality of units of software instructions, wherein the plurality of units of software instructions collectively comprise the codebase of the application; and
based at least in part on the abstract model, identifying the plurality of invoking units of software instructions that each directly invoke the one or more functions of the invoked unit of software instructions.

8. The method of claim 1, wherein the method further comprises providing data descriptive of modifications that modify the at least one invoking unit of software instructions of the plurality of invoking units of software instructions to invoke the interface.

9. The method of claim 1, wherein the at least one criterion comprises:
a number of invoking units of software instructions that invoke each function of the one or more functions of the invoked unit of software instructions;
a number of calls to an external unit of software instructions performed by each function of the one or more functions of the invoked unit of software instructions;
a degree of documentation associated with each function of the one or more functions of the invoked unit of software instructions; and/or
a degree of complexity associated with each function of the one or more functions of the invoked unit of software instructions.

10. The method of claim 1, wherein a plurality of separate files respectively comprise the plurality of invoking units of software instructions; and
wherein a file different than the plurality of separate files comprises the invoked unit of software instructions.

11. The method of claim 1, wherein a file comprises the invoked unit of software instructions and at least some of the plurality of invoking units of software instructions.

12. A computing system, comprising:
a memory; and
a processor device coupled to the memory to:
obtain codebase information for a codebase of an application that identifies a plurality of units of software instructions included in the codebase of the application;
based at least in part on the codebase information for the codebase of the application that identifies the plurality of units of software instructions, identify a plurality of invoking units of software instructions that each directly invoke one or more functions of an invoked unit of software instructions, wherein the plurality of units of software instructions comprises the plurality of invoking units of software instructions and the invoked unit of software instructions;
based on at least one criterion, select a first function of the one or more functions of the invoked unit of software instructions for inclusion in an interface; and
generate an interfacing unit of software instructions that implements the interface, wherein the interface is configured to be invoked by at least one invoking unit of software instructions of the plurality of invoking units of software instructions, and when the interface is invoked, to invoke the first function of the one or more functions of the invoked unit of software instructions.

13. The computing system of claim 12, wherein the processor device is further coupled to the memory to provide data descriptive of the interfacing unit of software instructions.

14. The computing system of claim 13, wherein providing the data descriptive of the interfacing unit of software instructions comprises providing data descriptive of the interfacing unit of software instructions to a code versioning system for the codebase of the application.

15. The computing system of claim 14, wherein the data descriptive of the interfacing unit of software instructions comprises a summarization of the interfacing unit of software instructions.

16. The computing system of claim 14, wherein the processor device is further coupled to the memory to obtain, from the code versioning system, data indicative of approval of the interfacing unit of software instructions.

17. The computing system of claim 16, wherein the processor device is further coupled to the memory to modify the codebase of the application to add the interfacing unit of software instructions.

18. The computing system of claim 12, wherein, to obtain the codebase information for the codebase of the application, the processor device is further coupled to the memory to:
generate an abstract model that identifies the plurality of units of software instructions, wherein the plurality of units of software instructions collectively comprise the codebase of the application; and
based at least in part on the abstract model, identify the plurality of invoking units of software instructions that each directly invoke the one or more functions of the invoked unit of software instructions.

19. The computing system of claim 12, wherein the processor device is further coupled to the memory to provide data descriptive of modifications that modify the at least one invoking unit of software instructions of the plurality of invoking units of software instructions to invoke the interface.

20. A non-transitory computer-readable storage medium that stores executable instructions to cause one or more processor devices to:
- obtain codebase information for a codebase of an application that identifies a plurality of units of software instructions included in the codebase of the application;
- based at least in part on the codebase information for the codebase of the application that identifies the plurality of units of software instructions, identify a plurality of invoking units of software instructions that each directly invoke one or more functions of an invoked unit of software instructions, wherein the plurality of units of software instructions comprises the plurality of invoking units of software instructions and the invoked unit of software instructions;
- based on at least one criterion, select a first function of the one or more functions of the invoked unit of software instructions for inclusion in an interface; and
- generate an interfacing unit of software instructions that implements the interface, wherein the interface is configured to be invoked by at least one invoking unit of software instructions of the plurality of invoking units of software instructions, and when the interface is invoked, to invoke the first function of the one or more functions of the invoked unit of software instructions.

* * * * *